US012050340B2

(12) United States Patent
Puehringer et al.

(10) Patent No.: US 12,050,340 B2
(45) Date of Patent: Jul. 30, 2024

(54) OPTICAL RESONATOR SYSTEM, NARROWBAND MID-INFRARED RADIATION SOURCE

(71) Applicant: Infineon Technologies AG, Neubiberg (DE)

(72) Inventors: Gerald Puehringer, Linz (AT); Gerald Stocker, Goritschach (AT); Andreas Tortschanoff, Villach (AT); Reyhaneh Jannesari, Plesching (AT); Clement Fleury, Villach (AT); Thomas Grille, Nötsch im Gailtal (AT); Bernhard Jakoby, Linz (AT); Cristina Consani, Villach (AT)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 18/046,231

(22) Filed: Oct. 13, 2022

(65) Prior Publication Data

US 2023/0125167 A1   Apr. 27, 2023

(30) Foreign Application Priority Data

Oct. 21, 2021   (EP) ..................................... 21204001

(51) Int. Cl.
  *G02B 6/10*     (2006.01)
  *G02B 6/122*    (2006.01)
  *G02B 6/12*     (2006.01)

(52) U.S. Cl.
  CPC .......... *G02B 6/102* (2013.01); *G02B 6/1223* (2013.01); *G02B 2006/12104* (2013.01)

(58) Field of Classification Search
  None
  See application file for complete search history.

(56) References Cited

U.S. PATENT DOCUMENTS

2020/0284721 A1 *  9/2020  Tortschanoff ...... G01N 21/3504
2020/0309686 A1   10/2020  Grille et al.
(Continued)

FOREIGN PATENT DOCUMENTS

EP         2621853 B1 *  4/2015  ............. B82Y 20/00

OTHER PUBLICATIONS

Lavchiev, Ventsislav et al., "Mid-infrared Rib Waveguide Absorption Sensors Based on Si", Proceedings of SPIE, vol. 8763, May 17, 2013, 7 pages, XP055100990, ISSN: 0277-786X, DOI: 10.1117/12.2017273.
(Continued)

*Primary Examiner* — Chris H Chu
(74) *Attorney, Agent, or Firm* — Slater Matsil, LLP

(57) ABSTRACT

An optical resonator system includes a multi-strip waveguide structure having spaced semiconductor strips for guiding an IR radiation, a STP resonance structure (STP=slab tamm-plasmon-polariton), wherein the STP resonance structure includes an alternating arrangement of semiconductor strips and interjacent dielectric strips and includes a metal strip adjacent to the semiconductor strip at a boundary region of the STP resonance structure, wherein the metal strip and the adjacent semiconductor strip are arranged to provide a metal-semiconductor interface, and wherein the semiconductor strips of the multi-strip waveguide structure and the semiconductor strips of the STP resonance structure are arranged perpendicular to each other, and an optical coupling structure having a semiconductor layer, wherein the semiconductor layer is arranged between the multi-strip waveguide structure and the STP resonance structure for optically coupling the IR radiation between the multi-strip waveguide structure and the STP resonance structure.

20 Claims, 10 Drawing Sheets

(56) References Cited

U.S. PATENT DOCUMENTS

2021/0243858 A1* 8/2021 Nagao .................. H01K 1/04
2022/0294382 A1* 9/2022 Boncyk ................ H02S 10/30

OTHER PUBLICATIONS

Puehringer, Gerald et al., "Impact of Different Metals on the Performance of Slab Tamm Plasmon Resonators", Sensors MDPI, Nov. 28, 2020, 14 pages.

Puhringer, Gerald et al., "Modeling of a CMOS-Compatible Slab Tamm Plasmon Absorber using N-Type Silicon", IEEE Sensors, Oct. 27, 2019, 4 pages, XP033685754, DOI: 10.1109/SENSORS43011.2019.8956847.

Puhringer, Gerald, et al., "Highly Selective CMOS-Compatible Mid-Infrared Thermal Emitter/Detector Slab Design Using Optical Tamm-States", Materials, vol. 12, No. 6, Mar. 20, 2019, 17 pages, XP055894179, DOI: 10.3390/ma12060929.

Ranacher, Christian et al., "Characterization of Evanescent Field Gas Sensor Structures Based on Silicon Photonics", IEEE Photonics Journal, An IEEE Photonics Society Publication, vol. 10, No. 5, Sep. 2018, 15 pages.

Ranacher, Christian et al., "Mid-infrared absorption gas sensing using a silicon strip waveguide", Elsevier Sensors and Actuators A 277 (2018) 117-123, May 8, 2018, 7 pages.

Stocker, G., et al., "Fabrication of integrated poly-silicon wave guides for mid-infrared absorption spectroscopy using the evanescent field", IEEE MikroSystemTechnik Congress, Nov. 8-10, 2021, 2 pages.

* cited by examiner

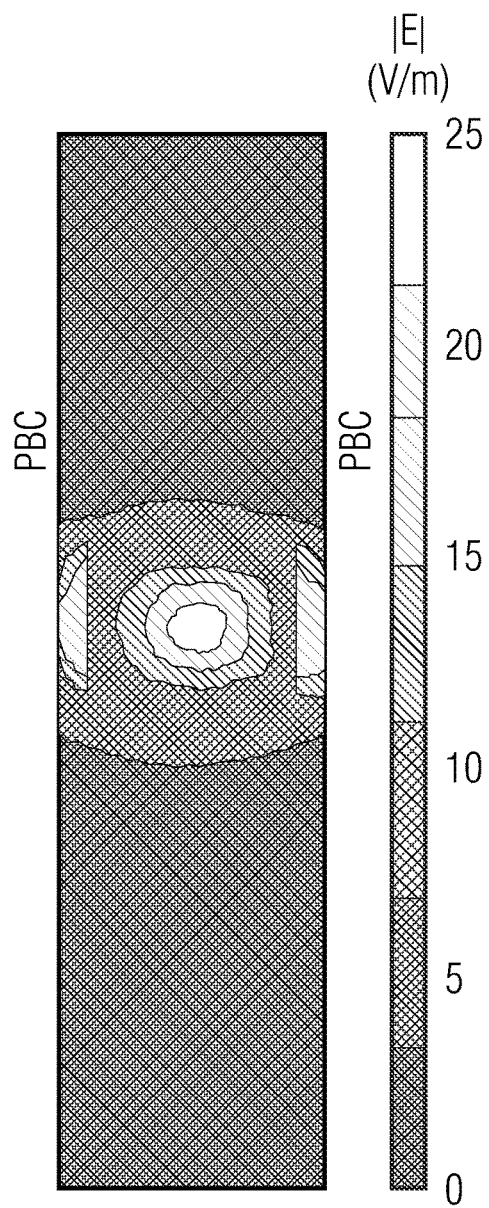
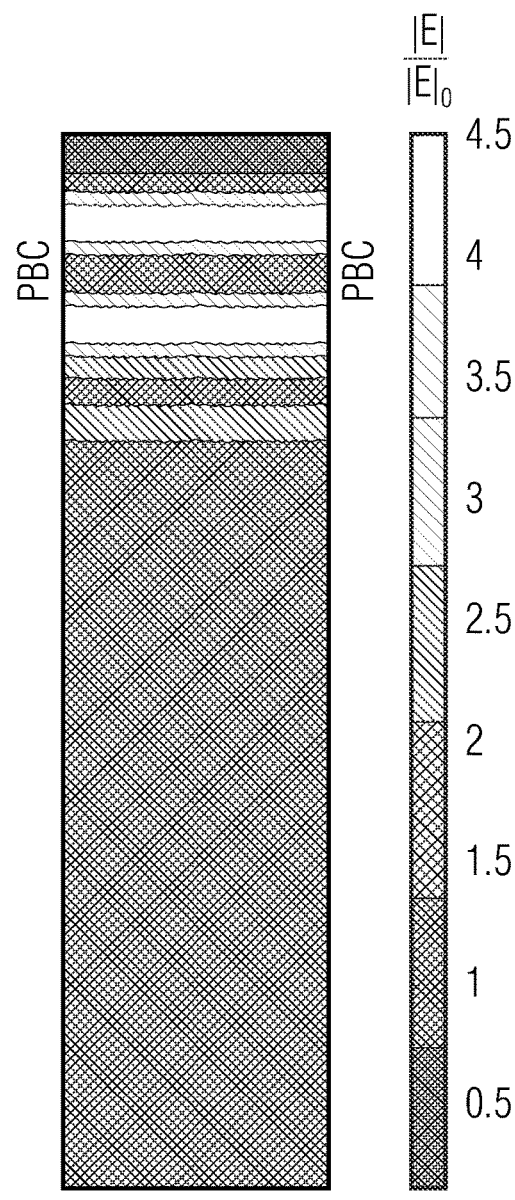
Fig. 5a
Fig. 5b

| substrate material | h (μm) | y | α (rad/m) | ε ($\lambda_r$) | Q |
|---|---|---|---|---|---|
| air | 0.7 | 14.1 % | 259 | 75 % | 77 |
| air | 0.8 | 12.5 % | 197 | 80 % | 81 |
| air | 0.9 | 11.3 % | 154 | 85 % | 88 |
| air | 1.0 | 10.4 % | 123 | 83 % | 94 |
| air | 1.1 | 9.8 % | 99 | 60.5 % | 64 |
| oxide | 0.7 | 13.8 % | 304 | 40.7 % | 52 |
| oxide | 0.8 | 12.3 % | 231 | 46.1 % | 58 |
| oxide | 0.9 | 11.2 % | 180 | 51.1 % | 74 |
| oxide | 1.0 | 10.3 % | 143 | 57.1 % | 65 |
| oxide | 1.1 | 9.7 % | 115 | 49.6 % | 60 |

Fig. 7

OPTICAL RESONATOR SYSTEM, NARROWBAND MID-INFRARED RADIATION SOURCE

This application claims the benefit of European Patent Application No. 21204001, filed on Oct. 21, 2021, which application is hereby incorporated herein by reference.

TECHNICAL FIELD

Embodiments relate in general to the field of sensor devices and components for sensor devices, and, more specifically, to the field of fluid (fluid=gas or liquid) sensors. In particular, embodiments relate to an optical resonator system, to a narrowband mid-infrared radiation source, and to a fluid sensor. More specifically, embodiments relate to a coupled waveguide-resonator-system for a selective emission and absorption in the mid-IR-spectrum (mid-IR=mid-infrared).

BACKGROUND

The detection of environmental parameters in the ambient atmosphere is becoming increasingly important in the implementation of appropriate sensors within mobile devices, for example, but also in the application in home automation, such as smart home, and, for example, in the automotive sector. However, with the ever more extensive use of sensors, there is also a particular need to be able to produce such sensors as inexpensively as possible and, thus, as cost effectively as possible. However, the resulting reliability and accuracy of the sensors should nevertheless be maintained or should be even increased.

In particular, the field of monitoring the air quality and the gas composition in our environment is receiving more and more attention. A typical optical gas sensor comprises a light source, filter elements for a wavelength selection, a detector and the sample area, where the light between the light source and the detector interacts with the environmental medium. Typically, such sensors are rather expensive to manufacture and/or rather bulky.

On-chip integration of a selective and efficient emitter/absorber currently presents a large challenge to the industrial sector. An implementation possibility on this technical field are quantum cascade structures (both for emission and for absorption), which offer a good performance. However, integrated emitters and detectors, which may be implemented by means of quantum cascade structures (QCLs), require a heterogeneous integration of III-V elements by means of bonding (InGaAs potential wells). Thus, their production involves considerable expenditure and cost, which renders it almost impossible for such structures to be integrated into low-cost, silicon-based CMOS manufacturing processes. Thus, due to the high cost, quantum cascade structures are not suitable for mass production.

An alternative, inexpensive implementation possibility on this technical field has been so far a doped nanowire producing Joule heating and thermal radiation by making contact with a voltage source. Even though such a solution is fully compatible with low-cost, silicon-based CMOS manufacturing processes, it represents a massive restriction to the sensitivity of miniaturized absorption sensors having such an emitter and, therefore, to the detection and resolution limit that may be achieved. The reason for this is the broad-band radiation spectrum that is similar to a Planck radiation. Such a broad spectrum restricts the relative change of the detector response in the presence of the gas to be detected since the gas absorbs only within a very narrowband range.

Generally, there is a need in the art for an approach to implement an improved optical resonator system and an improved narrowband mid-infrared radiation source, e.g. as respective components of an improved fluid sensor, wherein the components have low fabrication requirements but provide a resulting fluid sensor having an adequate sensitivity for the target fluid to be detected.

Such a need can be solved by the optical resonator system according to claim 1, by the narrowband mid-infrared radiation source according to claim 8 and by the fluid sensor according to claim 13.

Specific implementations of the optical resonator system, the narrowband mid-infrared radiation source and the fluid sensor are defined in the dependent claims.

SUMMARY

According to an embodiment, the optical resonator system comprises a multi-strip waveguide structure, a STP resonance structure (STP=slab tamm-plasmon-polariton), and an optical coupling structure. The multi-strip waveguide structure comprises a plurality of spaced semiconductor strips for guiding an IR radiation. The STP resonance structure comprises an alternating arrangement of semiconductor strips and interjacent dielectric strips and comprises a metal strip adjacent to the semiconductor strip at a boundary region of the STP resonance structure. The metal strip and the adjacent semiconductor strip are arranged to provide a metal-semiconductor interface at the boundary region of the STP resonance structure, wherein the semiconductor strips of the multi-strip waveguide structure and the semiconductor strips of the STP resonance structure are arranged perpendicular to each other in a common system plane. The optical coupling structure having a semiconductor layer, wherein the semiconductor layer is arranged between the multi-strip waveguide structure and the STP resonance structure for optically coupling the IR radiation between the multi-strip waveguide structure and the STP resonance structure.

According to an embodiment, a narrowband mid-infrared radiation source comprise the optical resonator system (as described above), and an infrared radiation emitter for emitting a broadband infrared radiation to the STP resonance structure, wherein the IR radiation in the resonance wavelength range of the STP resonance structure propagates from the STP resonance structure to the optical coupling structure and is coupled into the multi-strip waveguide structure.

According to an embodiment, a fluid [fluid=gas or liquid] sensor comprises the narrowband mid-infrared radiation source (as described above), and a mid-infrared radiation detector configured to provide a detector output signal based on an intensity of the guided (and filtered) infrared radiation (=infrared light-wave) received from the multi-strip waveguide structure.

Thus, embodiments represent a coupled, selective waveguide absorber system for the middle infrared spectrum which comprises CMOS compatibility and the capability of on-chip integration. Within this context, a guided wave couples with an optical resonator, which results in resonant (and therefore selective) absorption. Selective absorption implies that an external heater element enables selective emission into the guided wave mode (with a reverse sign of the propagation direction). The physical background thereto is Kirchhoff's law of thermal radiation. Thus, the structure may be used both as a resonant absorber and as a resonant emitter.

Therefore, the waveguide absorber system presented here enables a high level of efficiency of emission and absorption, wherein the range of the high efficiency level of quantum cascade structures may possibly be approximately achieved. At the same time, a production process operating within the framework of common mass production methods is enabled.

The proposed concept is potentially compatible with low-cost, silicon-based CMOS manufacturing processes. At the same time, it enables narrow-band emission and absorption. Emission/absorption is effected to/from a type of waveguide which exhibits superior properties with regard to sensitivity. Thus, the concept represents a complete emitter-waveguide and/or waveguide-absorber system. The light emitted, or the light which may be absorbed, is heavily polarized and has an elevated degree of coherence.

To summarize, the waveguide absorber system presented here enables manufacturing within the framework of common CMOS methods and materials (i.e., silicon-based materials and metals).

BRIEF DESCRIPTION OF THE DRAWINGS

In the following, embodiments of the present disclosure are described in more detail with respect to the figures, in which:

FIGS. 5a-5c show (a) the field of the incident mode of the multi-strip waveguide, (b) the field distribution at resonance (top view) of the waveguide absorber system, and (c) the field distribution at resonance in a longitudinal (cross-sectional) view;

FIG. 7 shows (in form of a table) a summary of results for varying substrate materials (air/oxide) and SI layer thicknesses h ("inclusion factor evanescent field $\gamma$, waveguide self-attenuation $\alpha$, spectral emissivity at/with resonance $\varepsilon(\lambda r)$, and Q factor of resonance").

In the following description, embodiments are discussed in further detail using the figures, wherein in the figures and the specification identical elements and elements having the same functionality and/or the same technical or physical effect are provided with the same reference numbers or are identified with the same name. Thus, the description of these elements and of the functionality thereof as illustrated in the different embodiments are mutually exchangeable or may be applied to one another in the different embodiments.

DETAILED DESCRIPTION OF ILLUSTRATIVE EMBODIMENTS

In the following description, embodiments are discussed in detail, however, it should be appreciated that the embodiments provide many applicable concepts that can be embodied in a wide variety of semiconductor devices. The specific embodiments discussed are merely illustrative of specific ways to make and use the present concept, and do not limit the scope of the embodiments. In the following description of embodiments, the same or similar elements having the same function have associated therewith the same reference signs or the same name, and a description of such elements will not be repeated for every embodiment. Moreover, features of the different embodiments described hereinafter may be combined with each other, unless specifically noted otherwise.

It is understood that when an element is referred to as being "connected" or "coupled" to another element, it may be directly connected or coupled to the other element, or intermediate elements may be present. Conversely, when an element is referred to as being "directly" connected to another element, "connected" or "coupled," there are no intermediate elements. Other terms used to describe the relationship between elements should be construed in a similar fashion (e.g., "between" versus "directly between", "adjacent" versus "directly adjacent", and "on" versus "directly on", etc.).

For facilitating the description of the different embodiments, some of the figures comprise a Cartesian coordinate system x, y, z, wherein the x-z-plane corresponds, i.e. is parallel, to a first main surface region of a substrate (=a reference plane=x-z-plane), wherein the direction vertically up with respect to the reference plane (x-z-plane) corresponds to the "+y" direction, and wherein the direction vertically down with respect to the reference plane (x-z-plane) corresponds to the "−y" direction. In the following description, the term "lateral" means a direction parallel to the x- and/or z-direction or a direction parallel to (or in) the x-z-plane, wherein the term "vertical" means a direction parallel to the y-direction.

Figure 1A:
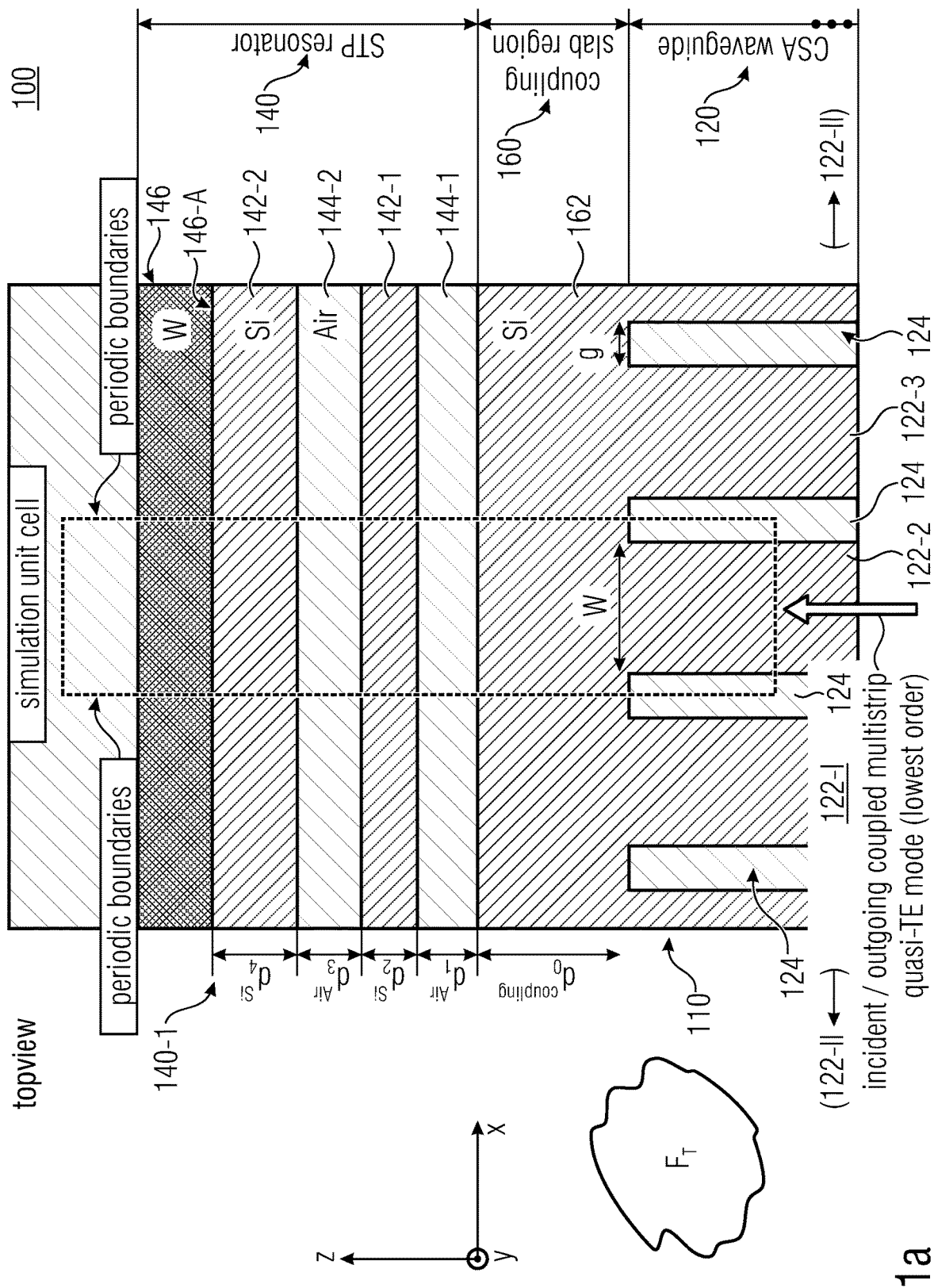
FIG. 1a shows a schematic top view (plane view) of an optical resonator system according to an embodiment.
Figure 1B:
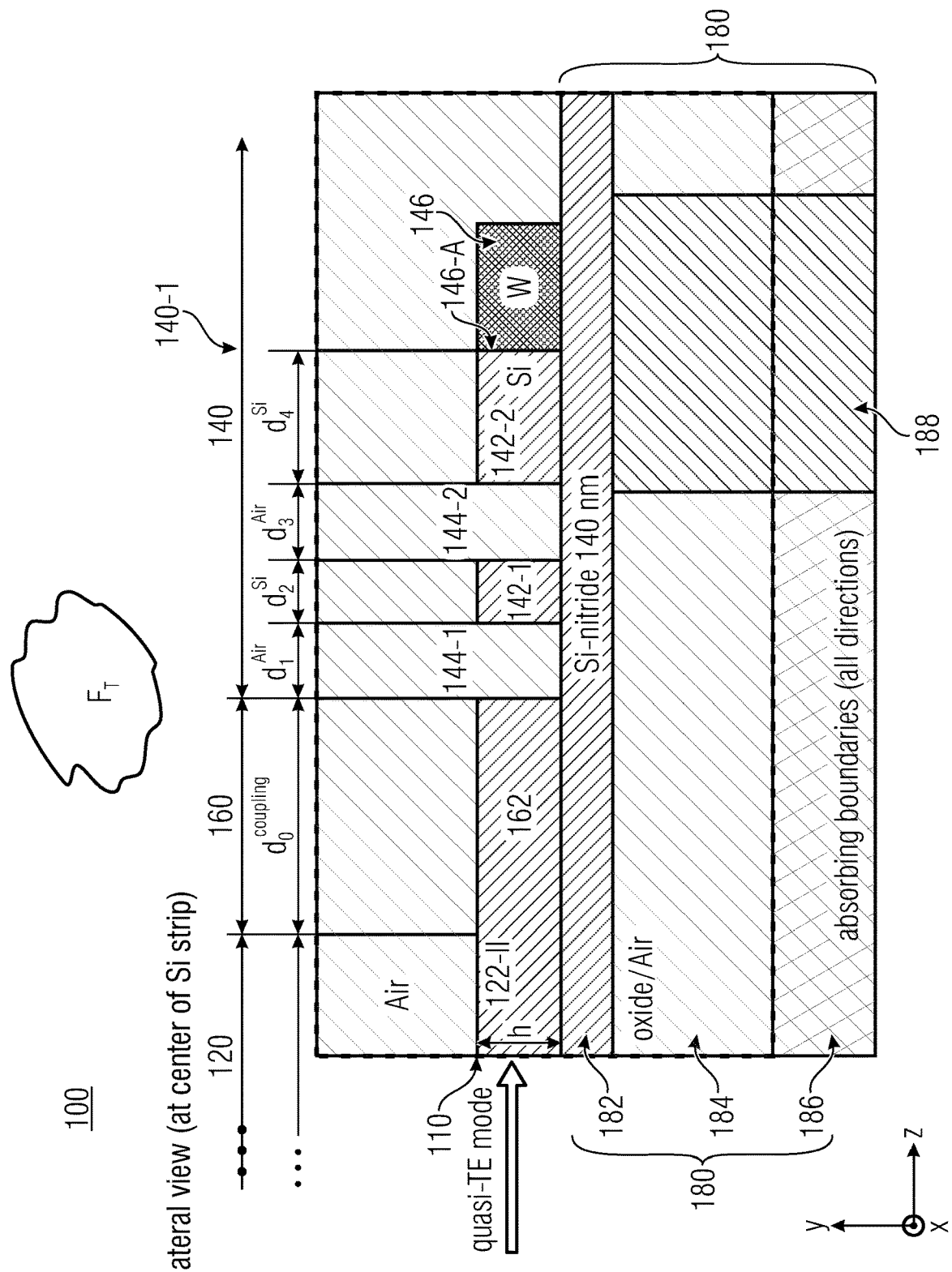
FIG. 1b shows a schematic cross-sectional view of the optical resonator system according to an embodiment.

FIGS. 1a-1b show a schematic representation of the optical resonator system 100 according to an embodiment. FIG. 1a shows a schematic plane view and FIG. 1b shows a schematic cross-sectional view of the optical resonator system 100 according to the embodiment.

As shown in FIGS. 1a-1b, the optical resonator system 100 comprises a multi-strip waveguide structure 120, a STP resonance structure 140 (STP=slab tamm-plasmon-polariton) and an optical coupling structure 160.

The multi-strip waveguide structure 120 comprises a plurality of spaced semiconductor strips 122-1, . . . , 122-n (122-#) for guiding an IR radiation RIR. In FIG. 1a, the multi-strip waveguide structure 120 is exemplarily shown to comprise three spaced (complete) semiconductor strips 122-1, 122-2, 122-3, wherein the number "n" of spaced semiconductor strips 122-1, . . . , 122-n may be between 50 and 200, or between 100 and 140, or (about) 120, for example, when considering an exemplary waveguide-width (=n×w, with w=width of a semiconductor strip) between 100 and 300 μm, between 150 and 250 μm, or of (about) 200 μm. The spaced semiconductor strips 122-1, . . . , 122-n may be separated by means of dielectric strips 124 (e.g. air gaps or oxide).

The STP resonance structure 140 comprises an alternating arrangement of semiconductor strips 142-1, . . . , 142-m and interjacent dielectric strips 144-1, . . . , 144-p (e.g., air gaps or oxide) and comprises a metal strip 146 adjacent to the semiconductor strip 142-m (=142-2 in FIGS. 1a-b) at a boundary region 140-1 of the STP resonance structure 140.

In FIGS. 1a-1b, STP resonance structure 140 is exemplarily shown to comprise two semiconductor strips 142-1, 142-2, i.e. the number "m" of spaced semiconductor strips 142-1, . . . , 142-m may be 2, for example. In FIGS. 1a-1b, STP resonance structure 140 is exemplarily shown to comprise two dielectric strips 144-1, 144-2, i.e. the number "p" of spaced dielectric strips 144-1, . . . , 144-p may be 2, for example (with m=p). The numbers m, p usually do not vary due to physical reasons, wherein the widths of the strips 142-1, 142-2, 144-1, 144-2 are (exactly) defined individually, as will be explained below.

The metal strip 146 and the adjacent semiconductor strip 142-m (142-2 in FIGS. 1a-1b) are arranged to provide a metal-semiconductor interface 146-A at the boundary region 140-1 of the STP resonance structure 140, wherein the semiconductor strips 122-1, . . . , 122-n of the multi-strip waveguide structure 120 and the semiconductor strips 142-1, . . . , 142-m of the STP resonance structure 140 are arranged perpendicular to each other in a common system plane (=x-z-plane).

The optical coupling structure 160 comprises a semiconductor layer 162, wherein the semiconductor layer 162 is arranged between the multi-strip waveguide structure 120 and the STP resonance structure 140 for optically coupling the IR radiation RIR between the multi-strip waveguide structure 120 and the STP resonance structure 140.

According to an embodiment, the STP resonance structure 140 may be implemented as a Bragg mirror structure laterally extending in the system plane. According to an embodiment, the semiconductor material of the multi-strip waveguide structure 120, of the STP resonance structure 140 and of the coupling structure 160 may comprise a semiconductor material, e.g. a base layer 110 having a silicon or polysilicon material, which is applied on a first main surface region 180-A of a substrate or substrate structure 180 (see FIG. 1b), which provides the system plane of the optical resonator system 100.

As shown in FIG. 1b, the substrate (or substrate structure) 180 may comprises a plurality of layers e.g., a first insulating (=dielectric) layer 182, a second insulating (=dielectric) layer 184 and (optionally) a semiconductor substrate layer 186. The first dielectric layer 182 may comprise nitride material, e.g. SiN, the second dielectric layer 184 may comprise an oxide material, e.g. BOX=buried oxide, such as SiO, or air, and the semiconductor substrate layer 186 may comprise silicon. Thus, the first main surface region of the first dielectric layer 182 forms the top main surface region 180-A of the substrate 180, i.e. the common system plane (=x-z-plane). As shown in FIG. 1b, the substrate structure 180 comprises a cavity 188 vertically below the metal-semiconductor interface 146-A at the boundary region 140-1 of the STP resonance structure 140. The formation of the cavity 188 in the substrate structure 180 below the metal-semiconductor interface 146-A at the boundary region 140-1 of the STP resonance structure 140 reduces the heat transfer from the metal-semiconductor interface 146-A into the adjacent material.

The first insulating layer 182 may comprise a thickness between 50 to 500 nm, between 100 and 200 nm, or of about 140 nm. The second insulating layer 114 may comprise a thickness between 500 to 5000 nm, between 1500 and 2500 nm, or of about 2000 nm. The semiconductor layer 186 may comprise a thickness between 50 to 500 nm, between 100 and 220 nm, or of about 160 nm.

The principle of the optical resonator system 100 is based on exciting so-called Tamm plasmon polaritons, which may occur as optical resonances at the boundary (interface) 146-A between a Bragg mirror 140 and a metal 146. Normally, Bragg mirrors 142-# (142-1, . . . , 142-m), 144-# (144-1, . . . , 144-p) and metal 146, i.e. the Tamm plasmon (TP) structure 140, are built with extended one-dimensional layers. If the Bragg mirror 140 and the metal 146 are tuned and adjusted to each other, perpendicularly incident light of the resonant wavelength $\lambda_{RES}$ (on the side of the Bragg mirror 140) will be fully absorbed by the resonance step-up (quality factor) of the field. The intrinsic losses of the metal are eventually responsible for complete absorption if the dielectrics are assumed to be approximately free from loss. This tuning (or matching) of the Bragg mirror 140 and the metal 146 refers to the individual amplitude reflection coefficients assigned to the Bragg mirror and the metal, respectively. Providing the employment of tungsten W, for example, this matching is considered in the design, as outlined below. The resonant absorption is also possible (e.g., with a different or lower performance), if other metals are used. Further, the design may be also tuned and optimized for other metals.

Thus, the core of the present disclosure is the optical resonator system 100 whose starting point is the dielectric layer waveguide 120 made of polysilicon, for example. This resonator system 100 is depicted in FIGS. 1a (upper area) and 1b (central area). Here, the layers of the TP structures 140 are no longer be extended (approximately) infinitely in two dimensions (parallel to the x-y-plane) but are (vertically) restricted by the height h of the (polysilicon) layer (y direction, see FIG. 1b). The Bragg mirror 140 (=region of alternating refractive indices 142-#, 144-#) may be achieved and produced by completely removing, e.g. by etching to the membrane 182, individual rectangular faces or regions (in the longitudinal section) of the poly-Si layer (=base layer 110). The extension of the poly-Si layer 110 and its etching-out of the plane may be considered as infinite. Directly next to the Bragg mirror 140, the metal layer 146 of about the same height as the poly-Si layer 110 is required. The metal layer 146 may comprise a stable, temperature-insensitive metal, such as W (tungsten), Ag (silver), Mo (Molybdenum), etc. The extension of the metal area/layer 146 may be selected, in principle, to be of any size. Only the relation to the membrane 180 surface must be taken into account for reasons concerning the heat flow. As there is no transmission of light through the metal, the width of the metal strip can be chosen arbitrarily wide, from an optical point-of-view. So, it can be chosen to be convenient for fabrication and thermal aspects. The height of the metal-strip may be equal to the polysilicon in a best-case scenario, for example (the height of the metal layer 146=height of the poly-Si layer (base layer) 110", for example).

Thus, the metal-semiconductor interface 146-A, e.g. a tungsten/silicon interface, is achieved/produced at one position. That boundary layer (interface) 146-A is essential for the "slab Tamm plasmon polariton" (STP) structure (or layer Tamm plasmon structure) 140. Instead of extended planar waves, the modeling is now faced with guided layer modes, where inclusion of the light is effected by the high refractive index of the silicon (e.g., poly-Si). The consequence for STP resonance structures 140 as compared to one-dimensional TP structures is that, with/at optical resonance, there are radiation losses into space, and that resonance can be effected only for a specific polarization, namely when the electric field is parallel to the substrate surface, i.e. is transverse-electric polarized (TE-polarized) or s-polarized. Thus, the STP resonance structure 140 provide a (field) suppression remote from the resonant wavelength and from TE polarization, wherein the field's increase (step-up) in the plasmonic resonance results in an increase of emission/absorption at the resonance wavelength and TE polarization.

So far, only the STP resonance structure 140 has been described which is a pure two-dimensional layer structure (infinite in its extension out of the plane). So as to complete the waveguide absorber system 100, the STP structure 140 is coupled to the periodic strip waveguide (multi-strip waveguide, see lower area of FIG. 1a) 120. The multi-strip waveguide 120 may be manufactured in an inexpensive manner by etching complete, continuous gaps of defined widths into a slab waveguide (planar waveguide) of polysilicon at periodic intervals or into the base layer 110, e.g. a silicon or poly-Si layer (at periodic intervals). Said type of waveguide 120 exhibits superior properties with regard to sensitivity (via simulation and experiment). The coupling of the multi-strip waveguide structure 120 to the STP resonance structure 140 is effected by means of the optical coupling structure 160, e.g. in form of a polysilicon layer (having an optimized lateral extension) between the STP structure 140 and the multi-strip waveguide 120. The optimized lateral extension may be derived from a semi-empirical optimization. It was found via simulation (by the inventors) that the optimized lateral extension may approximately corresponds to five times the averaged quarter-wavelength thickness considering the slab-waveguide and the coupled multi-strip-waveguide mode.

The complete waveguide absorber system 100 was simulated with a three-dimensional periodic unit cell (=simulation unit cell) by means of the finite element method. The three-dimensional periodic unit cell is exemplarily shown in FIGS. 1a-1b.

The resulting resonance wavelength range (target wavelength) $\lambda_{RES}$ of the STP resonance structure 140 of the optical resonator structure 100 may be chosen in a range between 4.15 and 4.35 µm, for example.

For the resulting resonance wavelength range (target wavelength) $\lambda_{RES}$ of the STP resonance structure 140 between 4.15 and 4.35 µm, the semiconductor strips 122-# of the multi-strip waveguide structure 120 may have a width w between 1.3 and 1.5 µm, a height h between 0.9 and 1.1 µm and a distance (gap) g between 0.25 and 0.35 µm. According to an embodiment, the semiconductor strips 122-# of the multi-strip waveguide structure 120 may have a width w of 1.4 µm, a height h of 1 µm and a distance g of 0.3 µm.

Accordingly, the semiconductor strip 142-$m$ (=142-2 in FIGS. 1a-1b) at the boundary region 140-1 of the STP resonance structure 140 may have a width $d_4$ between 1.0 and 1.15 µm and a height h between 0.9 and 1.1 µm. According to an embodiment, the semiconductor strip 142-$m$ (=142-2 in FIGS. 1a-1b) at the boundary region 140-1 may have a width $d_4$ of 1.07 µm and a height h of 1 µm. The further semiconductor strips 142-# (=142-1 in FIGS. 1a-1b) of the STP resonance structure 140 may have a width $d_2$ between 0.35 and 0.45 µm, a height h between 0.9 and 1.1 µm and a distance $d_1$, $d_3$ ($d_1^{Air}$, $d_3^{Air}$) between 0.5 and 0.6 µm. According to an embodiment, the further semiconductor strips 142-# (=142-1 in FIGS. 1a-1b) of the STP resonance structure 140 may have a width $d_2$ of 0.4 µm, a height h of 1 µm and a distance $d_1$, $d_3$ $d_1^{Air}$, $d_3^{Air}$) of 0.55 µm.

According to an embodiment, the semiconductor layer 162 of the coupling structure 160 may have a length $d_0$ between 1.7 and 2.1 µm and a height h between 0.9 and 1.1 µm. According to an embodiment, the semiconductor layer 162 of the coupling structure 160 may have a length $d_0$ of 1.9 µm and a height h of 1 µm.

In principle, a scaling of the above dimensions is possible for achieving a different resulting resonance wavelength range (target wavelength) $\lambda_{RES}$ of the STP resonance structure 140 of the optical resonator structure 100. However, it is to be kept in mind that the intrinsic absorption of Si gets dominant for wavelengths $\lambda > 6$ µm.

According to an embodiment, the multi-strip waveguide structure 120 comprises a plurality of slab waveguides 122-1, ..., 122-$n$ for guiding slab modes of the IR radiation $R_{IR}$.

Figure 2:
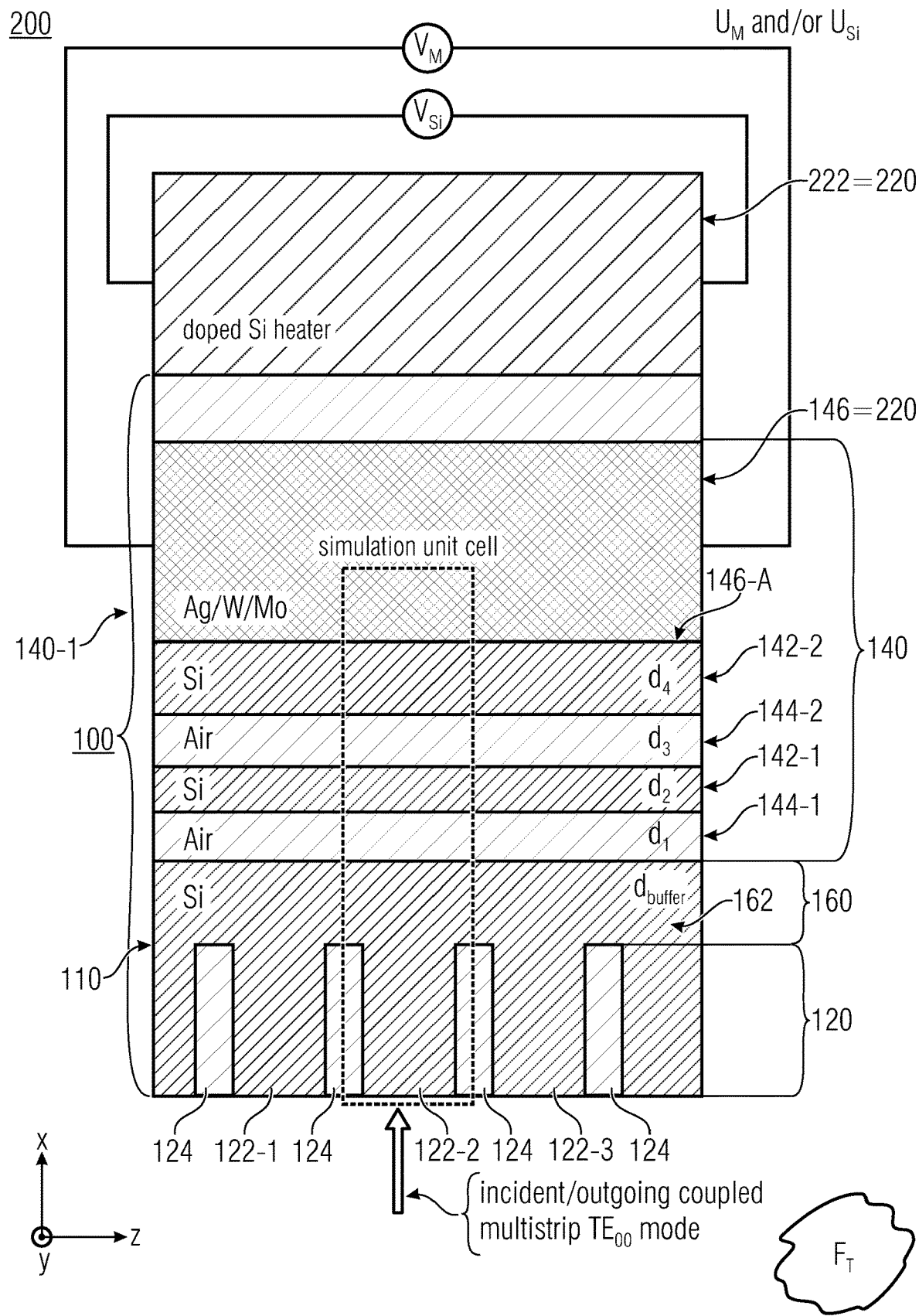
FIG. 2 shows a schematic top view of a narrowband mid-infrared radiation source according to an embodiment.

FIG. 2 shows a schematic top view of a narrowband mid-infrared radiation source 200 according to an embodiment. The narrowband mid-infrared radiation source 200 comprises the optical resonator system 100 as described above with respect to FIGS. 1a-1b, and an infrared radiation emitter 220 for emitting a broadband infrared radiation $R_{IR}$ to the STP resonance structure 140, wherein the IR radiation $R_{IR}$ in the resonance wavelength range $\lambda_{RES}$ of the STP resonance structure 140 propagates from the STP resonance structure 140 to the optical coupling structure 160 and is coupled into the multi-strip waveguide structure 120.

According to an embodiment, the STP resonance structure 140 is configured as an optical filter structure to filter the broadband infrared radiation $R_{IR}$ emitted by the infrared radiation emitter 220 and to provide the IR radiation $R'_{IR}$ as a filtered infrared radiation having a center wavelength $\lambda_0$ according to the resonance wavelength range $\lambda_{RES}$ of the STP resonance structure 140.

According to an embodiment, the multi-strip waveguide structure 120 is configured to guide the (filtered) IR radiation $R'_{IR}$ having the center wavelength $\lambda_0$, wherein the guided IR radiation $R'_{IR}$ (=the filtered IR radiation guided by the multi-strip waveguide structure) comprises an evanescent field component for interacting with the surrounding atmosphere.

According to an embodiment, the coupling structure 160 is configured to couple a mode of the IR radiation with the center wavelength $\lambda_0$ into the multi-strip waveguide structure.

According to an embodiment, the metal strip 146 adjacent to the semiconductor strip 142-2 at the boundary region 140-1 of the STP resonance structure 140 may be (optionally) arranged to form a heating element, i.e. the infrared radiation emitter 220. Thus, the metal (e.g., Ag, W, Mo, ...) 146 may be contacted so as to generate Joule heating by applying a voltage.

According to a further (optional) embodiment, a free standing (isolated) highly n-doped polysilicon wire 222 may be optionally provided as the heating element (thermal radiation emitter) 220, that emits broadband IR radiation $R_{IR}$ proportionally to the Planck's radiation law. The n-doped polysilicon wire may be heated in the vicinity of the Si/W boundary 146-1, as optionally depicted in FIG. 2.

The heating element 220 (optionally in form of the metal strip 146 or in form of doped polysilicon wire 222) may be configured to have in an actuated condition an operating temperature in a range between 600 and 1000 or between 600 and 700K. In the actuated condition of the metal strip 146, the metal strip 146 is connected to the voltage source $V_M$. In the actuated condition of the polysilicon wire 222, the polysilicon wire 222 is connected to the voltage source $V_{Si}$. According to an embodiment, the infrared radiation emitter is connected to a power source 240 for providing the electrical energy to bring the infrared radiation emitter in the actuated condition.

Figure 3:
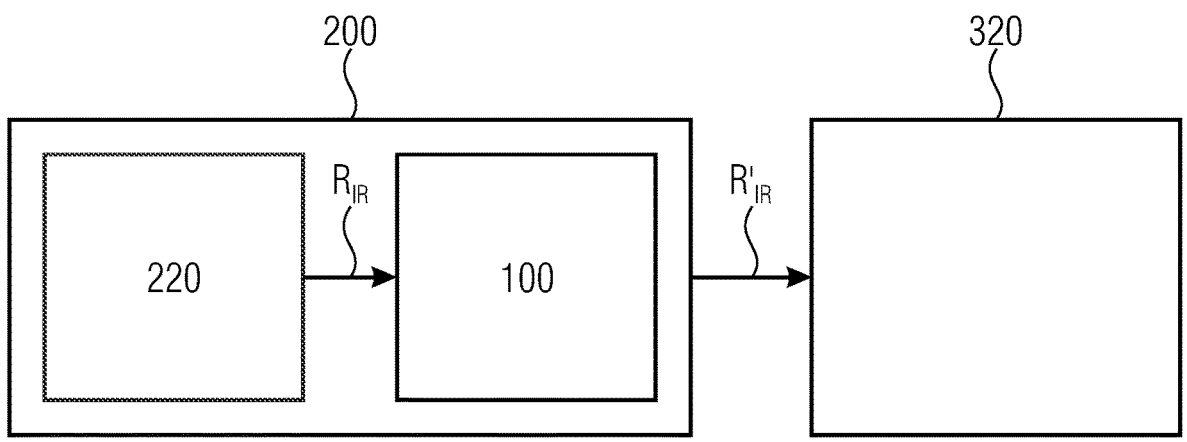
FIG. 3 shows an exemplary schematic illustration of a fluid sensor according to an embodiment.
Figure 3:
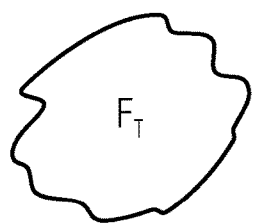

FIG. 3 shows an exemplary schematic illustration of a fluid sensor 300 according to an embodiment. According to an embodiment, a fluid sensor 300 comprises the narrowband mid-infrared radiation source 200 as described above with respect to FIG. 2, and a mid-infrared radiation detector 320 configured to provide a detector output signal based on an intensity of the guided (and filtered) infrared radiation (=infrared light-wave) $R'_{IR}$ received from the multi-strip waveguide structure 120.

According to an embodiment, the mid-infrared radiation detector may comprise a thermopile structure, wherein the mid-infrared radiation detector is configured to sense an incoming guided infrared radiation which is a measure of the concentration of a target fluid $F_T$ in the surrounding atmosphere based on the evanescent field absorption effected by the target fluid $F_T$. The interaction of the evanescent field component with the target fluid in the surrounding atmosphere results in a reduction of the transmitted IR radiation (guided infrared radiation transmitted by the multi-strip waveguide 120 between the emitter 200 and the detector 300) due to absorption which is a measure for the target fluid concentration in the surrounding atmosphere.

According to a further embodiment, the mid-infrared radiation detector may comprise at least one of a pyroelectric temperature sensor, a piezoelectric temperature sensor, a pn-junction temperature sensor and a resistive temperature sensor.

The filtered IR radiation guided by the waveguide 120 comprises an evanescent field component for interacting with the surrounding atmosphere having the target fluid, wherein the interaction of the evanescent field component with the surrounding atmosphere results in a reduction of the transmitted thermal radiation $R'_{IR}$ due to absorption of the guided radiation $R'_{IR}$ which is a measure for the target fluid concentration in the surrounding atmosphere or medium. Thus, the fluid sensor 300 may provide a CMOS MID IR gas and liquid sensor for sensing the target fluid concentration (e.g. $CO/CO_2/O_3/NOx$/methane, for example) in the surrounding atmosphere or medium, based on a formation of a superimposed evanescent field, with narrowband mid-infrared radiation source 200 as described above with respect to FIG. 2, and a mid-infrared radiation detector 320.

In the present context, the term fluid may relate to a liquid or a gas. In case, the environmental medium relates to environmental air, the target fluid may relate to a target gas or target gas component which is present in the environmental air. The present concept is equally applicable to sensing a target liquid or a target liquid component in the environmental medium.

Figure 4A:
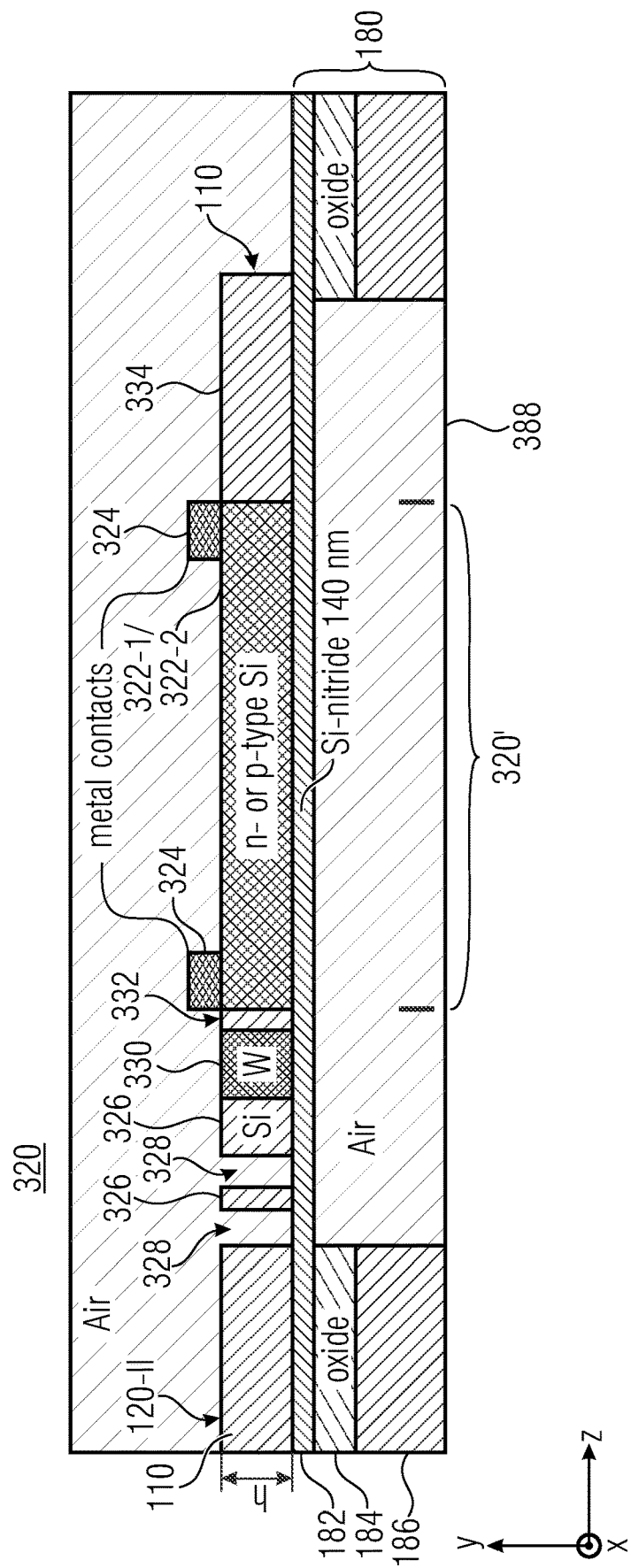
FIG. 4a shows a schematic cross-sectional view of a mid-infrared radiation detector according to an embodiment.
Figure 4B:
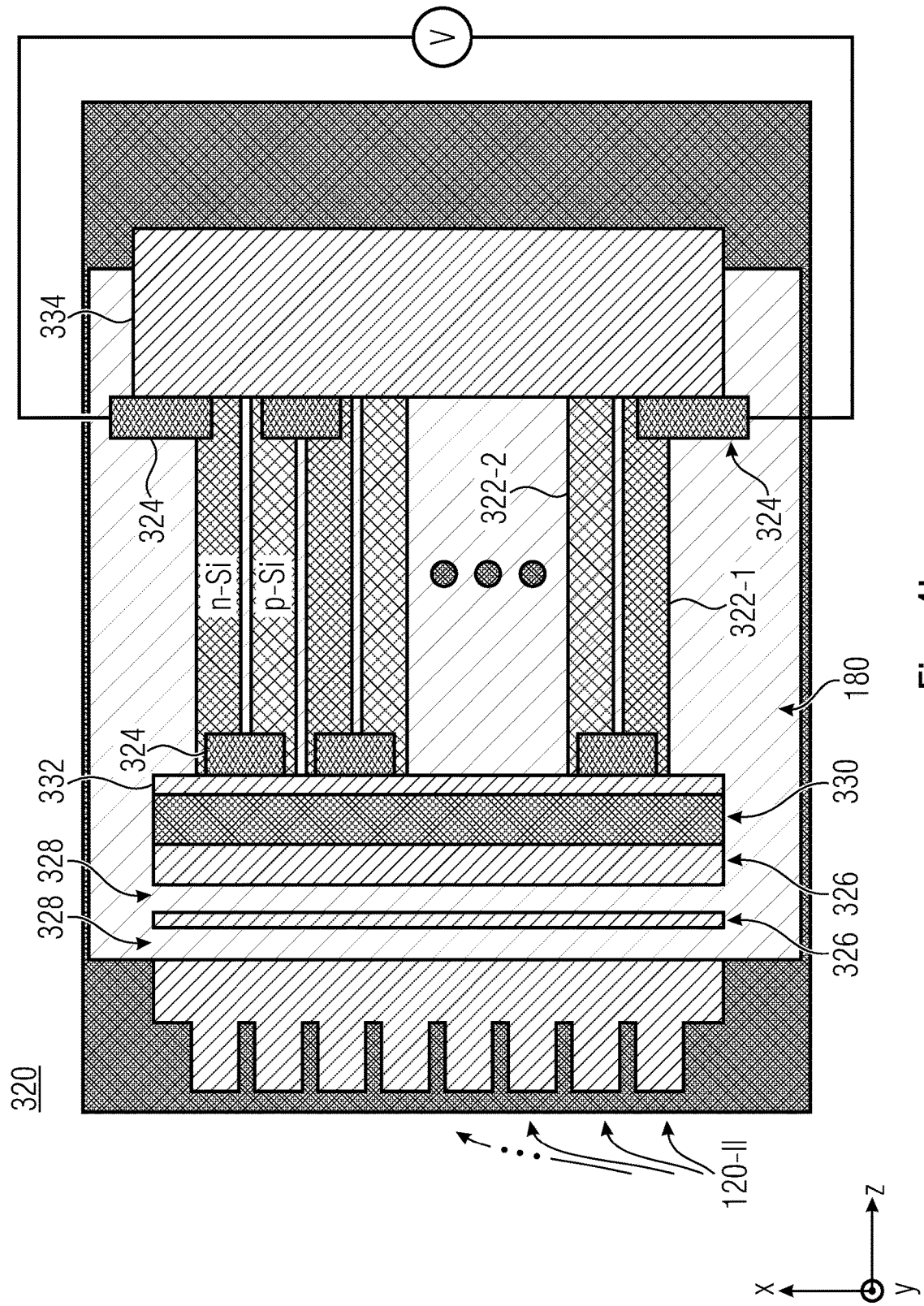
FIG. 4b shows a schematic cross-sectional view of the mid-infrared radiation detector according to the embodiment.

FIG. 4a shows a schematic cross-sectional view of a mid-infrared radiation detector 320 having a thermopile structure according to an embodiment. FIG. 4b shows a schematic cross-sectional view of the mid-infrared radiation detector 320 having a thermopile structure 320' according to the embodiment.

The mid-infrared radiation detector 320 may be arranged on the substrate (or substrate structure) 180 having the plurality of layers 182, 184 and (optionally) 186. As shown in FIG. 4b, the substrate structure 180 comprises a further cavity 388 vertically below the thermopile structure. The formation of the cavity 388 in the substrate structure 180 reduces the heat transfer from the thermopile structure 320' into the adjacent material. The thermopile structure comprises a plurality of Si strips 322-1, 322-2 of alternating doping (phosphorus and boron) which are electrically connected by means of metal contacts 324 to provide a meander form of the connected metal strips 322-1, 322-2.

At the input portion of the thermopile structure 320' (adjacent to the waveguide 120), the radiation detector 320 comprises an alternating arrangement of semiconductor strips 326 and interjacent dielectric strips 328 (e.g., air gaps or oxide) and comprises a metal strip 330 adjacent to the semiconductor strip 326 at a boundary region 320-1 of the thermopile structure 320'. The alternating arrangement of semiconductor strips 326 and interjacent dielectric strips 328 is laterally sandwiched between the (semiconductor) region 120 and the metal 330.

The mid-infrared radiation detector 320 forms a resonant absorber, which provides a wavelength-selective absorption and, subsequently, selective heat generation. As the metal 330 is the absorptive element, the center of the heat-generation will be there. This results in a temperature difference between left and right side of the thermopile structure 320'. The purpose of the strip 332, e.g. a silica ($SiO_2$) strip, is an electrical insulation from the metal contacts 324, while maintaining close thermal contact with the doped Si-strips 322-1, 322-2. The purpose of the semiconductor region 334 (Si-slab) is a thermal contact with the substrate 180. So, in order to maximize the temperature difference between left and right side, the metal 330 and the strip 332 next to the thermopile structure 320' should be as narrow as possible while the extent of the semiconductor region 334 may form an optimization parameter for the thermal design (depending on the membrane size, the thermal conductivity of the doped strips, etc.) and may be equal to zero eventually.

For measuring a selective detection and resonant absorption of the transmitted thermal radiation $R'_{IR}$, an implementation by means of a thermopile is possible, as depicted in FIGS. 4a-4b. Selective absorption ensures selective heating in the area of the Si/metal boundary layer. With corresponding contacting of Si strips of alternating doping (phosphorus and boron), a (detectable) voltage V is now generated by the Seebeck effect when the resonant wavelength is contacted by the STP resonance structure 140, i.e. transmitted from the STP resonance structure 140 over the multi-strip waveguide 120 to the mid-infrared radiation detector 220. In FIGS. 4a-4b, it is also possible and feasible to replace the metal (metal contacts) with a very high doped polysilicon (e.g., a phosphorus doping concentration ($\sim 10^{21}$ $cm^{-3}$) close to the solubility limit).

According to an embodiment, the substrate comprises a cavity vertically below at least one of the infrared radiation emitter and the mid-infrared radiation detector.

The formation of the cavity 188, 388 in the substrate structure 180 below the thermal radiation emitter 120 and optionally below the thermal radiation detector 320 reduces the heat transfer from the thermal radiation emitter 120 and/or the thermal radiation detector 320 into the adjacent material so that the emission efficiency of the thermal radiation emitter as well as the detection efficiency of the thermal radiation detector can be increased.

Figure 5C:
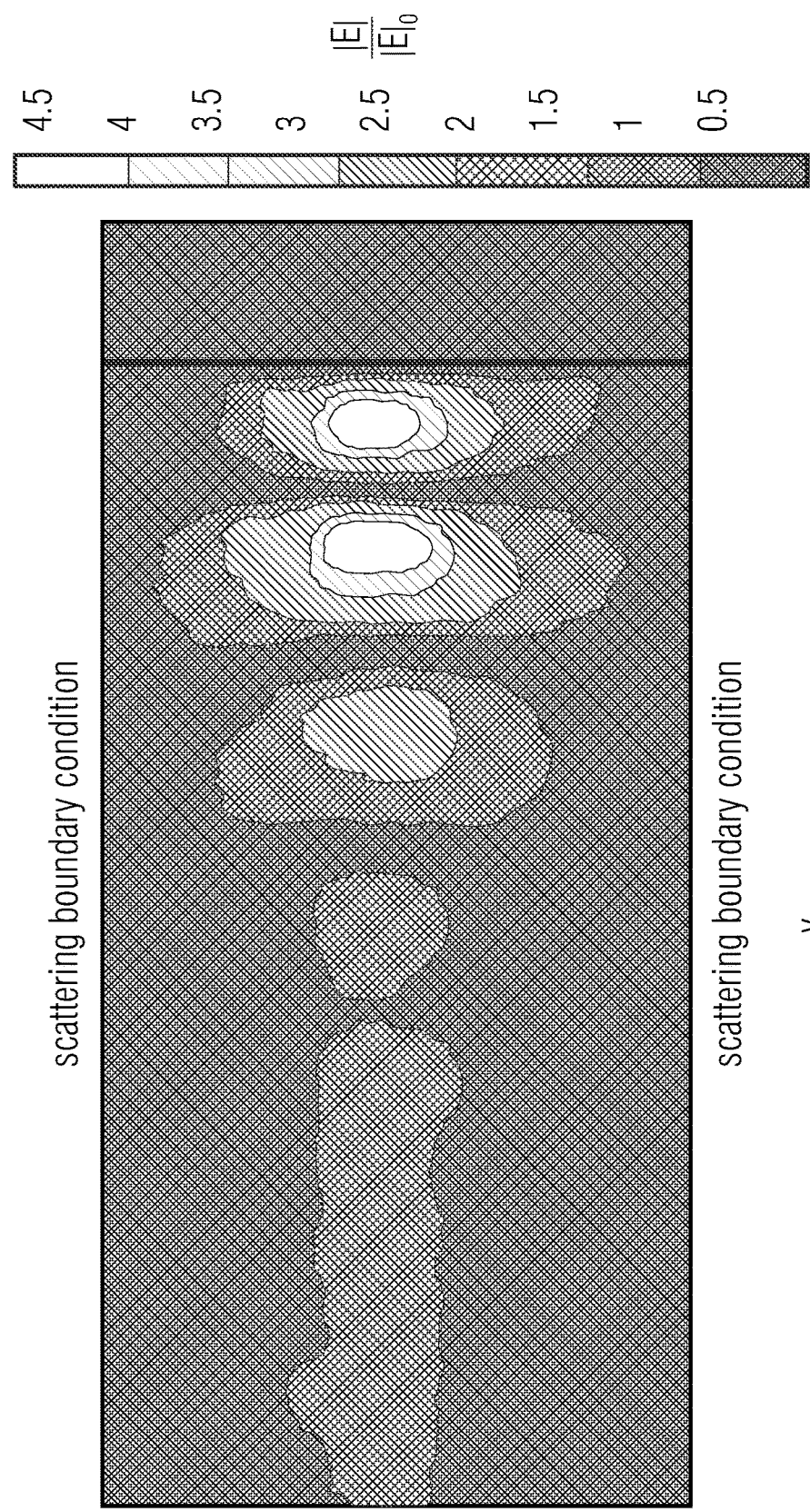

FIGS. 5a-5c show (a) the field of the incident mode of the multi-strip waveguide (also representing the WG mode (WG=waveguide) for corresponding sensing applications), (b) the field distribution at resonance (top view) of the waveguide absorber system, and (c) the field distribution at resonance in a longitudinal (cross-sectional) view.

Figure 6A:
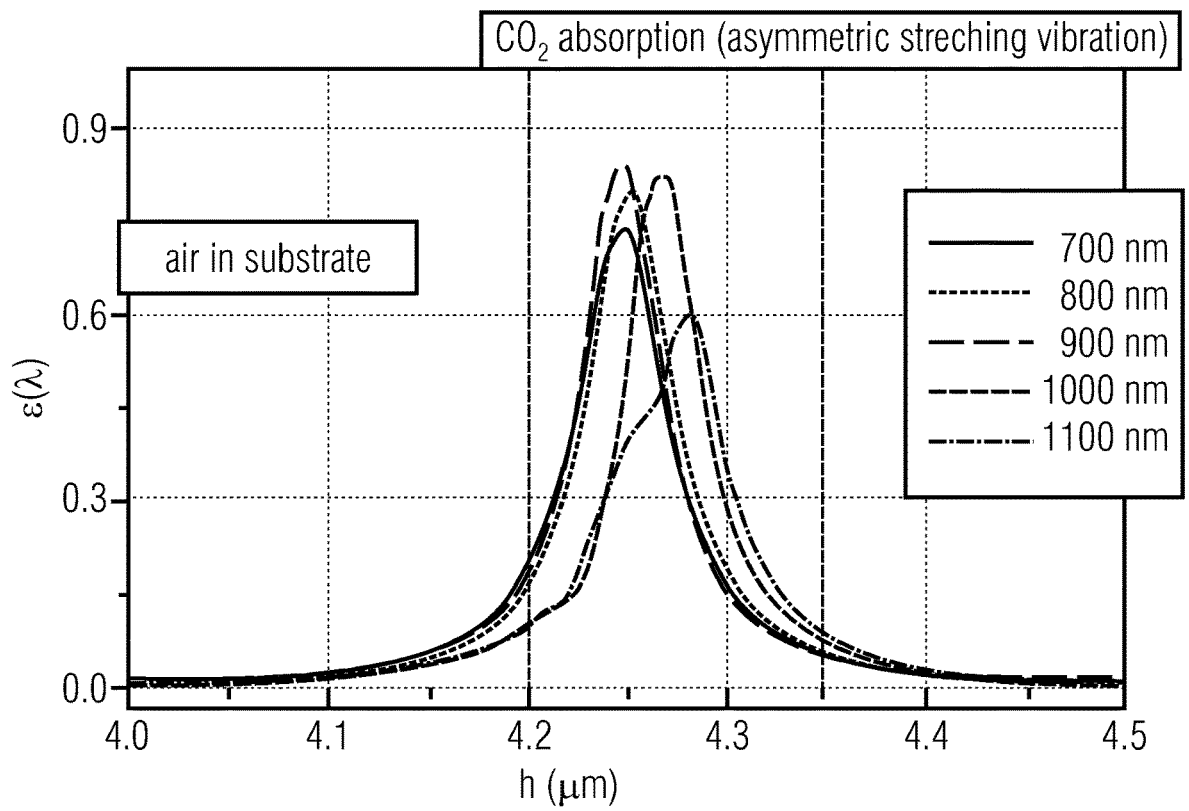
FIGS. 6a-6b shows a selective absorption for different heights of the polysilicon layer for (a) air under the nitride membrane and (b) for oxide under the nitride membrane according to an embodiment.
Figure 6B:
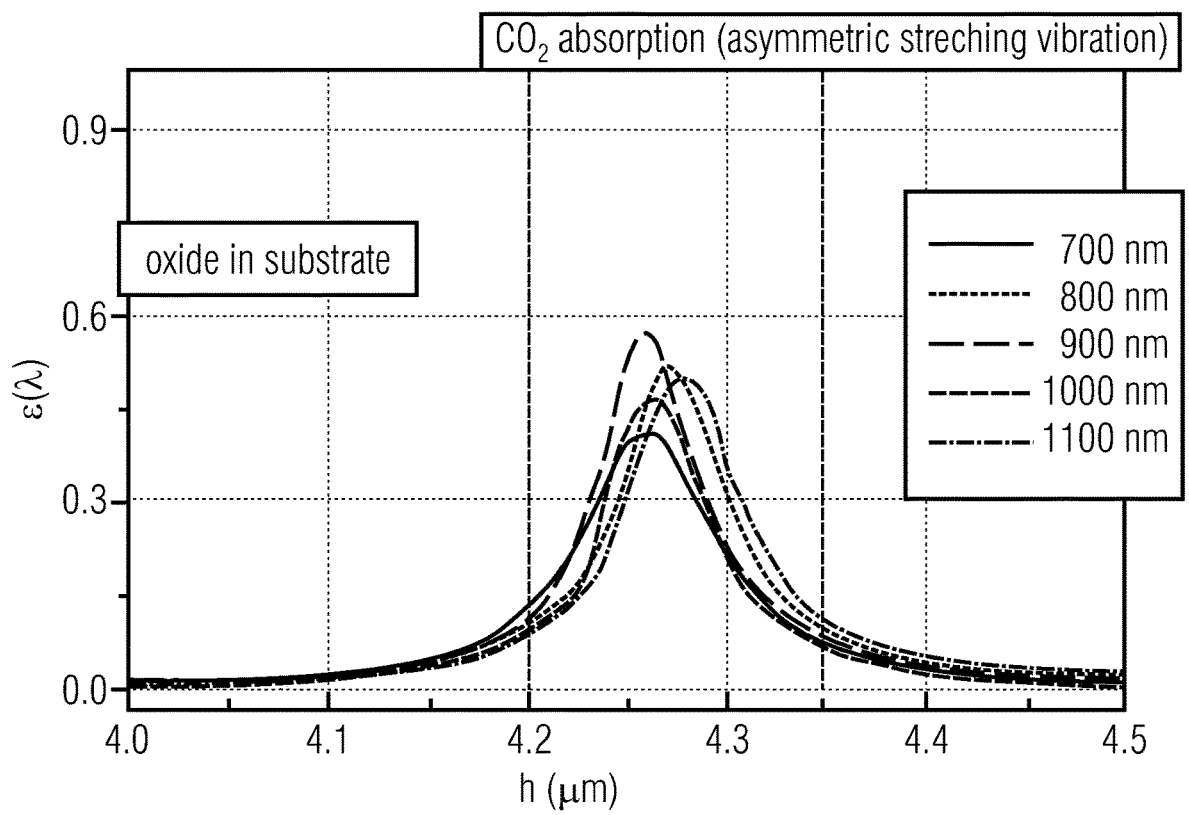

FIGS. 6a-6b show a selective absorption for different heights of the polysilicon layer for (a) air under the nitride membrane and (b) for oxide under the nitride membrane according to an embodiment.

FIG. 7 shows (in form of a table) a summary of results for varying substrate materials (air/oxide) and SI layer thicknesses h ("inclusion factor evanescent field γ, waveguide self-attenuation α, spectral emissivity at/with resonance $\epsilon(\lambda_r)$, and Q factor of resonance").

FIGS. 5b-5c just demonstrate the relative field enhancement from the simulation, which, in turn, is a measure for the possible improvement of the detection limit of such a resonant sensor in relation to a sensor featuring a broadband source. The same is true for FIGS. 6 and 7, which highlight the influence of the polysilicon thickness on the performance.

Additional embodiments and aspects are described which may be used alone or in combination with the features and functionalities described herein.

According to an embodiment, the optical resonator system comprises a multi-strip waveguide structure, a STP resonance structure (STP=slab tamm-plasmon-polariton), and an optical coupling structure.

The multi-strip waveguide structure comprises a plurality of spaced semiconductor strips for guiding an IR radiation. The STP resonance structure comprises an alternating arrangement of semiconductor strips and interjacent dielectric strips and comprises a metal strip adjacent to the semiconductor strip at a boundary region of the STP resonance structure. The metal strip and the adjacent semiconductor strip are arranged to provide a metal-semiconductor interface at the boundary region of the STP resonance structure, wherein the semiconductor strips of the multi-strip waveguide structure and the semiconductor strips of the STP resonance structure are arranged perpendicular to each other in a common system plane. The optical coupling structure having a semiconductor layer, wherein the semiconductor layer is arranged between the multi-strip waveguide structure and the STP resonance structure for optically coupling the IR radiation between the multi-strip waveguide structure and the STP resonance structure.

According to an embodiment, the STP resonance structure is implemented as a Bragg mirror structure laterally extending in the system plane.

According to an embodiment, the semiconductor material of the multi-strip waveguide structure, of the STP structure and of the coupling structure may comprise a semiconductor material, e.g. a silicon or polysilicon material, which is applied on a first main surface region of a substrate, which provides the system plane of the optical resonator system.

According to an embodiment, the semiconductor strips of the multi-strip waveguide structure have a width between 1.3 and 1.5 µm, a height between 0.9 and 1.1 µm and a distance between 0.25 and 0.35 µm, and in particular a width of 1.4 µm, a height of 1 µm and a distance of 0.3 µm.

According to an embodiment, the semiconductor strip at the boundary region of the STP resonance structure has a width between 1.0 and 1.15 µm and a height between 0.9 and 1.1 µm, and in particular a width of 1.07 µm and a height of 1 µm, wherein the further semiconductor strips of the STP resonance structure have a width between 0.35 and 0.45 µm, a height between 0.9 and 1.1 µm and a distance between 0.5 and 0.6 µm, and in particular a width of 0.4 µm, a height of 1 µm and a distance of 0.55 µm.

According to an embodiment, the semiconductor layer of the coupling structure has a length between 1.7 and 2.1 µm and a height between 0.9 and 1.1 82 m, and in particular a length of 1.9 µm and a height of 1 µm.

According to an embodiment, the multi-strip waveguide structure comprises a plurality of slab waveguides for guiding slab modes of the IR radiation.

According to an embodiment, a narrowband mid-infrared radiation source comprise the optical resonator system, and an infrared radiation emitter for emitting a broadband infrared radiation to the STP resonance structure, wherein the IR radiation in the resonance wavelength range of the STP resonance structure propagates from the STP resonance structure to the optical coupling structure and is coupled into the multi-strip waveguide structure.

According to an embodiment, the STP structure is configured as an optical filter structure to filter the broadband infrared radiation emitted by the infrared radiation emitter and to provide the IR radiation as a filtered infrared radiation having a center wavelength according to the resonance wavelength range of the STP resonance structure.

According to an embodiment, the multi-strip waveguide structure is configured to guide the (filtered) IR radiation having the center wavelength, wherein the guided IR radiation (the filtered IR radiation guided by the multi-strip waveguide structure) comprises an evanescent field component for interacting with the surrounding atmosphere.

According to an embodiment, the coupling structure is configured to couple a mode of the IR radiation with the center wavelength $\lambda_0$ into the multi-strip waveguide structure.

According to an embodiment, the metal strip adjacent to the semiconductor strip at the boundary region of the STP resonance structure is arranged to form a heating element and is configured to have in an actuated condition an operating temperature in a range between 600 and 1000 or between 600 and 700K, and wherein the infrared radiation emitter is connected to a power source for providing the electrical energy to bring the infrared radiation emitter in the actuated condition.

According to an embodiment, a fluid sensor comprises the narrowband mid-infrared radiation source, and a mid-infrared radiation detector configured to provide a detector output signal based on an intensity of the guided (and filtered) infrared radiation (=infrared light-wave) received from the multi-strip waveguide structure.

According to an embodiment, the mid-infrared radiation detector comprises a thermopile structure, wherein the mid-infrared radiation detector is configured to sense an incoming guided infrared radiation which is a measure of the concentration of a target fluid in the surrounding atmosphere based on the evanescent field absorption effected by the target fluid, wherein the interaction of the evanescent field component with the target fluid in the surrounding atmosphere results in a reduction of the transmitted IR radiation (guided infrared radiation transmitted by the multi-strip waveguide) due to absorption which is a measure for the target fluid concentration in the surrounding atmosphere.

According to an embodiment, the substrate comprises a cavity vertically below at least one of the infrared radiation emitter and the mid-infrared radiation detector.

Additional embodiments and aspects are described which may be used alone or in combination with the features and functionalities described herein.

Although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus.

Depending on certain implementation requirements, embodiments of the control circuitry can be implemented in hardware or in software or at least partially in hardware or at least partially in software. Generally, embodiments of the control circuitry can be implemented as a computer program product with a program code, the program code being operative for performing one of the methods when the computer program product runs on a computer. The program code may for example be stored on a machine readable carrier.

In the foregoing detailed description, it can be seen that various features are grouped together in examples for the purpose of streamlining the disclosure. This method of disclosure is not to be interpreted as reflecting an intention that the claimed examples require more features than are expressly recited in each claim. Rather, as the following claims reflect, subject matter may lie in less than all features of a single disclosed example. Thus, the following claims are hereby incorporated into the detailed description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

Although specific embodiments have been illustrated and described herein, it will be appreciated by those of ordinary skill in the art that a variety of alternate and/or equivalent implementations may be substituted for the specific embodiments shown and described without departing from the scope of the present embodiments. This application is intended to cover any adaptations or variations of the specific embodiments discussed herein. Therefore, it is intended that the embodiments be limited only by the claims and the equivalents thereof.

What is claimed is:

1. An optical resonator system, comprising:
   a multi-strip waveguide structure having a plurality of semiconductor strips that are spaced for guiding an IR radiation;
   a STP resonance structure (STP=slab tamm-plasmon-polariton), wherein the STP resonance structure comprises an alternating arrangement of semiconductor strips and interjacent dielectric strips and comprises a metal strip adjacent to the semiconductor strip at a boundary region of the STP resonance structure,
   wherein the metal strip and an adjacent semiconductor strip are arranged to provide a metal-semiconductor interface at the boundary region of the STP resonance structure, and
   wherein the semiconductor strips of the multi-strip waveguide structure and the semiconductor strips of the STP resonance structure are arranged perpendicular to each other in a common system plane; and
   an optical coupling structure having a semiconductor layer, wherein the semiconductor layer is arranged between the multi-strip waveguide structure and the STP resonance structure for optically coupling the IR radiation between the multi-strip waveguide structure and the STP resonance structure, wherein the multi-strip waveguide structure and the optical coupling structure are formed from a unitary rectangular slab having a common width with the STP resonance structure.

2. The optical resonator system according to claim 1, wherein the STP resonance structure is implemented as a Bragg mirror structure laterally extending in the common system plane.

3. The optical resonator system according to claim 1, wherein a semiconductor material of the multi-strip waveguide structure, of the STP resonance structure and of the optical coupling structure comprises a polysilicon material, which is applied on a first main surface region of a substrate, which provides the common system plane of the optical resonator system.

4. The optical resonator system according to claim 1, wherein the semiconductor strips of the multi-strip waveguide structure have a width between 1.3 and 1.5 µm, a height between 0.9 and 1.1 µm and a distance between 0.25 and 0.35 µm, and in particular a width of 1.4 µm, a height of 1 µm and a distance of 0.3 µm.

5. The optical resonator system according to claim 1,
   wherein a first semiconductor strip of the STP resonance structure at the boundary region of the STP resonance structure has a width between 1.0 and 1.15 µm and a height between 0.9 and 1.1 µm, and in particular a width of 1.07 µm and a height of 1 µm, and
   wherein the semiconductor strips of the STP resonance structure other than the first semiconductor strip have a width between 0.35 and 0.45 µm, a height between 0.9 and 1.1 µm and a distance between 0.5 and 0.6 µm, and in particular a width of 0.4 µm, a height of 1 µm and a distance of 0.55 µm.

6. The optical resonator system according to claim 1, wherein the semiconductor layer of the optical coupling structure has a length between 1.7 and 2.1 µm and a height between 0.9 and 1.1 µm, and in particular a length of 1.9 µm and a height of 1 µm.

7. The optical resonator system according to claim 1, wherein the multi-strip waveguide structure comprises a plurality of slab waveguides for guiding slab modes of the IR radiation.

8. A narrowband mid-infrared radiation source, comprising:
   the optical resonator system according to claim 1; and
   an infrared radiation emitter for emitting a broadband infrared radiation to the STP resonance structure, wherein the IR radiation in a resonance wavelength range of the STP resonance structure propagates from the STP resonance structure to the optical coupling structure and is coupled into the multi-strip waveguide structure.

9. The narrowband mid-infrared radiation source according to claim 8, wherein the STP resonance structure is configured as an optical filter structure to filter the broadband infrared radiation emitted by the infrared radiation emitter and to provide the IR radiation as a filtered infrared radiation having a center wavelength according to the resonance wavelength range of the STP resonance structure.

10. The narrowband mid-infrared radiation source according to claim 9, wherein the multi-strip waveguide structure is configured to guide the IR radiation having the center wavelength, wherein the guided IR radiation comprises an evanescent field component for interacting with a surrounding atmosphere.

11. The narrowband mid-infrared radiation source according to claim 9, wherein the optical coupling structure is configured to couple a mode of the IR radiation with the center wavelength into the multi-strip waveguide structure.

12. The narrowband mid-infrared radiation source according to claim 8, wherein the metal strip adjacent to a first semiconductor strip of the STP resonance structure at the boundary region of the STP resonance structure is arranged to form a heating element and is configured to have in an actuated condition an operating temperature in a range between 600 and 1000 or between 600 and 700K, and wherein the infrared radiation emitter is connected to a power source for providing electrical energy to bring the infrared radiation emitter in the actuated condition.

13. A fluid sensor, comprising:
the narrowband mid-infrared radiation source according to claim 8, and
a mid-infrared radiation detector configured to provide a detector output signal based on an intensity of guided infrared radiation received from the multi-strip waveguide structure.

14. The fluid sensor according to claim 13, wherein the mid-infrared radiation detector comprises a thermopile structure, wherein the mid-infrared radiation detector is configured to sense an incoming guided infrared radiation which is a measure of a concentration of a target fluid in a surrounding atmosphere based on evanescent field absorption effected by the target fluid, wherein an interaction of an evanescent field component with the target fluid in a surrounding atmosphere results in a reduction of transmitted IR radiation due to absorption which is a measure for a target fluid concentration in the surrounding atmosphere.

15. The fluid sensor according to claim 13, wherein a substrate comprises a cavity vertically below at least one of the infrared radiation emitter and the mid-infrared radiation detector.

16. A method of operating an optical resonator system, comprising: a multi-strip waveguide structure having a plurality of spaced semiconductor strips for guiding an IR radiation; a STP resonance structure (STP=slab tamm-plasmon-polariton), wherein the STP resonance structure comprises an alternating arrangement of semiconductor strips and interjacent dielectric strips and comprises a metal strip adjacent to the semiconductor strip at a boundary region of the STP resonance structure, wherein the metal strip and an adjacent semiconductor strip are arranged to provide a metal-semiconductor interface at the boundary region of the STP resonance structure, and the semiconductor strips of the multi-strip waveguide structure and the semiconductor strips of the STP resonance structure are arranged perpendicular to each other in a common system plane; and an optical coupling structure having a semiconductor layer, wherein the semiconductor layer is arranged between the multi-strip waveguide structure and the STP resonance structure, and wherein the multi-strip waveguide structure and the optical coupling structure are formed from a unitary rectangular slab having a common width with the STP resonance structure, the method comprising:

receiving IR radiation by the multi-strip waveguide structure; and
optically coupling the IR radiation between the multi-strip waveguide structure and the STP resonance structure via the optical coupling structure.

17. The method of claim 16, wherein:
the multi-strip waveguide structure comprises a plurality of slab waveguides; and
the method further comprises guiding slab modes of the IR radiation via the plurality of slab waveguides.

18. A method of operating a fluid sensing system comprising an infrared radiation emitter, an infrared radiation detector, and an optical resonator system, comprising: a multi-strip waveguide structure having a plurality of spaced semiconductor strips for guiding an IR radiation; a STP resonance structure (STP=slab tamm-plasmon-polariton), wherein the STP resonance structure comprises an alternating arrangement of semiconductor strips and interjacent dielectric strips and comprises a metal strip adjacent to the semiconductor strip at a boundary region of the STP resonance structure, wherein the metal strip and an adjacent semiconductor strip are arranged to provide a metal-semiconductor interface at the boundary region of the STP resonance structure, and the semiconductor strips of the multi-strip waveguide structure and the semiconductor strips of the STP resonance structure are arranged perpendicular to each other in a common system plane; and an optical coupling structure having a semiconductor layer, wherein the semiconductor layer is arranged between the multi-strip waveguide structure and the STP resonance structure, and wherein the multi-strip waveguide structure and the optical coupling structure are formed from a unitary rectangular slab having a common width with the STP resonance structure, the method comprising:
emitting IR radiation vie the infrared radiation emitter;
receiving the IR radiation by the optical resonator system;
measuring an intensity of radiation received from by the optical resonator system by the infrared radiation detector; and
providing a detector output signal based on the measured intensity of radiation.

19. The method of claim 18, wherein:
the STP resonance structure is configured as an optical filter structure; and
the method further comprises filtering the received IR radiation received by the optical resonator system.

20. The method of claim 18, wherein the measured intensity of radiation is based on a concentration of a target fluid in a surrounding atmosphere.

* * * * *